United States Patent

Dittman

[15] 3,668,262
[45] June 6, 1972

[54] HIGH DENSITY FLUOROBROMOALKANES FOR GYROSCOPE FLOTATION

[72] Inventor: Albert L. Dittman, Hackensack, N.J.
[73] Assignee: Halocarbon Products Corporation
[22] Filed: Sept. 8, 1969
[21] Appl. No.: 855,999

[52] U.S. Cl................................260/653.1 T, 74/5
[51] Int. Cl........................C07c 19/08, C08f 3/20
[58] Field of Search...........................260/653.1 T

[56] References Cited

OTHER PUBLICATIONS

Krespan et al., J. Am. Chem. Soc. 83, 3,424– 3,427 (1961).

Primary Examiner—Daniel D. Horwitz
Attorney—Burgess, Dinklage & Sprung

[57] ABSTRACT

Totally substituted fluoro-bromo hydrocarbons useful as gyroscopic damping and flotation oils are obtained by reacting tetrabromomethane with bromotrifluoroethylene or tribromofluoromethane with bromotrifluoroethylene in the presence of ultraviolet radiation.

Normal tetrabromotetrafluoropropane and normal pentabromoheptafluoropentane are specifically claimed.

A polymer separated from the reaction products and having the formula: $CFBr_2 (CF_2CFBr)_n CF_2CFBr_2$ where $n = 3$ to $10$ is particularly useful as a gyroscopic flotation oil because it has a rather high density which changes very little with the molecular weight of the polymer.

5 Claims, 1 Drawing Figure

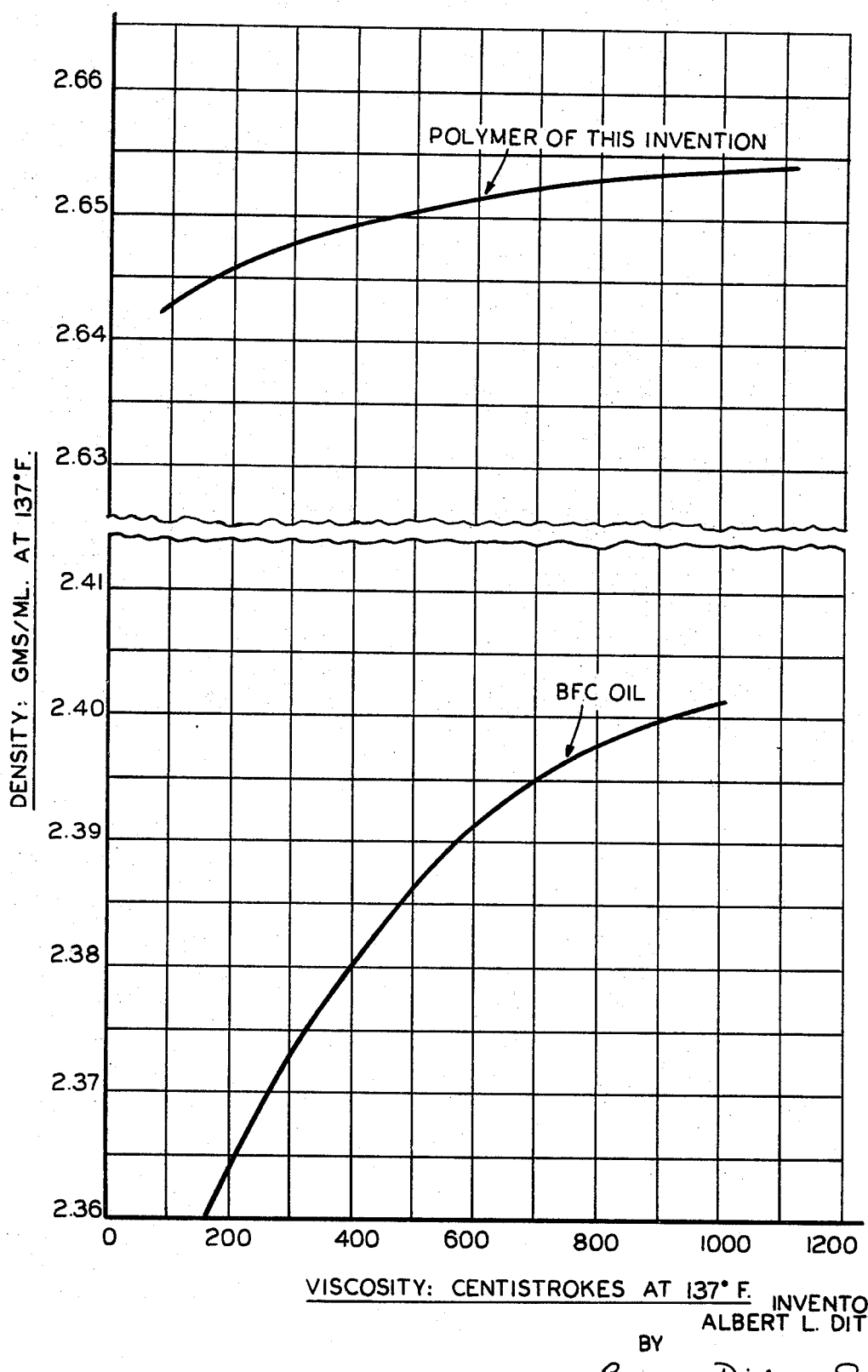

HIGH DENSITY FLUOROBROMOALKANES FOR GYROSCOPE FLOTATION

PRIOR ART

U.S. Pat. No. 3,020,768 (Falk) illustrates one type of cyroscope in which the flotation oils of this invention can be used.

DESCRIPTION

This invention is concerned with a polymer with the formula:

$$CFBr_2(CF_2CFBr)_n CF_2CFBr_2$$

where $n = 0$ to about 10. A mixture of these low polymers is an oil of high density which is relatively inert by a standard corrosion test, Randall strips. Oils of this type are used as damping and flotation fluids for instruments such as gyroscopes and accelerometers.

This particular oil has a rather high density while still retaining other features of inertness and compatibility. The higher density oil can be used to float gyroscopes with heavier flywheels achieving a greater accuracy. Another advantage for a higher density oil is that it can be used to float a more compact gyroscope of higher bulk density without sacrificing accuracy.

For such an oil, the density must be carefully chosen and then closely maintained during its use in the instrument. A density change in a section of the instrument provides a torque which gives a false signal as to the orientation of the gyroscope. Spontaneous density changes may occur in a gyroscope on the following way. The gyroscopes have warmer and cooler zones which can separate polymers into lower and higher molecular weights by thermal diffusion. Unfortunately, most polymers change in density as their molecular weight changes, i.e. higher molecular weight goes with higher density.

The polymer of this invention is quite unusual. Its density changes very little with molecular weight where $n = 3$ or more. This is illustrated in the attached graph. Using viscosity as a measure of molecular weight the graph shows that density/viscosity slope is very small for the new polymer while it is significant for a commercial gyroscope flotation fluid, "BFC OIL." Specifically, for molecular weights in the vicinity of 700 centistokes (at 137° F) BFC oil will change 0.0035 g./ml. in density for each 100 centistokes change in viscosity. The present polymer changes only 0.0007 g./ml. for each 100 centistokes change. The magnitude of the difference between the oils is exemplified by a typical density specification for a BFC oil which allows a density deviation of ±0.002 g./ml. from the desired value. Thus changes in density for the new fluid will be negligible as a consequence of molecular weight changes due to either thermal diffusion in the instruments or losses of more volatile components during the filling of the instrument.

The lower members of this polymer family, where $n = 0$ or 1, can be isolated from the whole polymer by distillation. The compound, 1,1,3,3-tetrabromo-1,2,2,3-tetrafluoropane ($n=0$) has a high density (2.6196 g./ml. at 137° F), a low viscosity (0.998 centistokes at 137° F), a low freezing point (−57.6° C) and a relatively low vapor pressure (boiling point 61° C at 6 mm. of Hg or 95° C at 30 mm. of Hg or an estimated 196° C at 760 mm. of Hg). This propane has good thermal stability at 120° C and is not corrosive to Randall strips at this temperature for at least 48 hours. The material shows no signs of unsaturation.

The polymer where $n=1$, namely 1,1,3,5,5-pentabromo-1,2,2,3,4,4,5-heptafluoropentane has a high density (2.6316 g/ml. at 125° F), a low viscosity (2.8 centistokes at 125° F) and a very low vapor pressure (boiling point 63° C at a 0.08 mm. of Hg or an estimated 300° C at 760 mm. of Hg). The pentane has good thermal stability and is not corrosive to Randall strips.

The low polymers where $n=0$ or 1 have the advantage of being pure compounds where the density is independent of handling techniques. For instance, excessive degassing causes average molecular weight changes in polymer mixtures by virtue of volatiliy of the lower members. Single pure compounds do not suffer this problem.

For certain flotation agent applications low viscosity and or low temperature usage are desired. The low polymers are especially useful in these areas.

The polymers may tend to discolor in the presence of light (especially ultraviolet) and air. These sensitivities are mitigated by the addition of as little as 0.01 percent of an antioxidant (such as Catalin CAO-1). In the presence of an antioxidant the polymers can be handled under ordinary conditions. In use these materials are usually not in contact with air and are maintained in the dark.

EXAMPLES

The polymers can be prepared in many ways, of which the following two examples are illustrative:

EXAMPLE 1

About 740 g. of $CBr_4$ and 360 g. of $CF_2 = CFBr$ were sealed in each of four glass tubes under a vacuum. The tubes were placed in a water bath at 50°–55° C for 72 hours while being irradiated with a total of 640 watts of ultraviolet light from sun lamps. The tubes were cooled and opened and the oil was stripped of low boiling components by heating to a temperature of 75° C at approximately 1 mm. of Hg pressure. A total of 1,874 g. of oil remained from the four tubes. This oil was stripped further through a film still at 70° C and about 0.1 mm. of pressure.

Of this residue 835 g. was dissolved in 130 ml. of bromine and this mixture was treated with 31 g. of chlorine trifluoride at 30° C. A band in the infrared spectrum assigned to the end group $—CBr_3$ (13.1$\mu$) was essentially removed at this point due to formation of $—CBr_2F$. This oil was stripped of bromine and then distilled to a pot temperature of 96° C at 1 mm. of pressure. The residue, 623 g., was a viscous, high density oil. Bromine trifluoride can be used in place of the bromine and chlorine trifluoride to remove the $—CBr_3$ end groups.

This oil probably contains some polymer chains which grew from the $—CBr_3$ end groups originally present. Such a polymer would have the formula:

$$CBr_2FCF_2CBr_2(CF_2CFBr)_mCF_2CFBr_2$$

EXAMPLE 2

Tribromofluoromethane (5,185 g.) was placed in a 5 liter flask equipped with a magnetic stirrer, a thermowell, and inlet and outlet tube and a pressure gage. The flask was placed in a water bath in a Pyrex bell jar surrounded by 4 × 275 watt sun lamps. The temperature in the bath was maintained at 80° C.

The methane was freed of air by nitrogen and vacuum purges. Bromotrifluoroethylene (5,450 g.) was added to the closed system over a 58.5 hour period maintaining close to atmospheric pressure throughout the addition.

The pot was then stripped of low boiling components ($CFBr_3$, $CF_2 = CFBr$ and others) at 60° C with a vacuum. A total of 1,761 g. was removed. About 21 g. of bromine was added over a 2 day period at 35°–45° C under incandescent light. More low boiling material was stripped from the pot (935 g. removed). At this point chlorine was added, first through the vapor phase inlet and later through the liquid phase inlet. This was continued at 35° C until all signs of unsaturation (IR and $KMnO_4$ tests) disappeared.

The oil was washed with 5% NaOH solution and dried through a column of silica gel yielding 6,700 g. This oil was passed through a film still at 100°–110° C at 0.2-0.4 mm. of Hg yielding 4,531 g. of residue. The residue was passed through the film still again at 112°–114° C at 0.08 mm. of Hg and 3,324 g. remained as residue. A third pass at 110°–114° C at 0.10 to 0.12 mm. of Hg yielding a residue of 2,874 g. This residue had a viscosity of 510 centistokes at 137° F and a density of 2.6502 at 137° F.

The oil was not corrosive to Randall strips for 48 hours at 120° C and was quite saturated by a typical KMnO$_4$ test. It has a pour point of +40° F and cloud point of −38° F at which point it cracks.

The oil was also made following the same procedure but omitting the bromination prior to chlorination. The final residue had a density of 2.6496 and viscosity of 451 centistokes at 137° F. An oil made in this way but distilled until the residue had a viscosity of 1,100 centistokes at 137° F was shown to have an average molecular weight of 1,059 by vapor pressure osmometry.

The propane (where =0) can be prepared in many ways. Examples 3 and 4 are given as illustration.

EXAMPLE 3

About 740 g. of CBr$_4$ and 360 g. of CF$_2$ = CFBr were sealed in each of four glass tubes under a vacuum. The tubes were placed in a water bath at 50°–55° C for 72 hours while being irradiated with a total of 640 watts from sun lamps. The tubes were cooled and opened. The low boiling components were removed first by simple stripping in a vacuum still bringing the pot temperature to 75° C at about 0.1 mm. of pressure. Fluorination of the distillates with chlorine trifluoride and bromine to remove all —CBr$_3$ end groups yields a mixture containing the new propane. This compound can be separated by distillation through a column in a vacuum. The plateau fraction that boils near 61° C at 6 mm. of Hg is quite pure.

EXAMPLE 4

Tribromofluoromethane (5,185 g.) was placed in a 5 liter flask equipped with a magnetic stirrer, a thermowell, and inlet and outlet tube and pressure gage. The flask was placed in a water bath in a Pyrex bell jar surrounded by 4 × 275 watt sun lamps. The temperature in the bath was maintained at 80° C.

The methane was freed of air by nitrogen and vacuum purges. Bromotrifluorethylene (5,450 g.) was added to the closed system. over a 58.5 hour period maintaining close to atmospheric pressure throughout the addition.

The pot was then stripped of low boiling components (CFBr$_3$, CF$_2$ = CFBr and others) at 60° C with a vacuum. A total of 1761 g. was removed. After treating the residue with bromine and chlorine to remove a small amount of olefinic material the residue was stripped of an additional 1,296 g. This residue was passed through a film still at 100°–110° C at 0.2–0.4 mm. of Hg. The removal of olefinic compounds can be done equally well with chlorine alone.

All the appropriate overhead materials were combined and distilled through a 6 inch Vigreaux column at reduced pressure. The cut boiling at 85°–86° C at 14 mm. of Hg was subsequently redistilled through a 2 × 45 cm. column. The plateau material with a boiling point of 61° C at 6 mm. of Hg was quite pure CFBr$_2$CF$_2$CFBr$_2$. Analyses: Calculated for C: 8.35; for F: 17.60; for Br: 74.05; found for C: 8.41; for F: 17.42; for Br: 74.22.

The pentane (where n=1) can be prepared in many ways. Examples 5 and 6 are given as illustration.

EXAMPLE 5

About 740 g. of CBr$_4$ and 360 g. of CF$_2$ = CFBr were sealed in each of four glass tubes under a vacuum. The tubes were placed in a water bath at 50°–55° C for 72 hours while being irradiated with a total of 640 watts from sun lamps. The tubes were cooled and opened. The low boiling components were removed first by simple stripping in a vacuum still bringing the pot temperature to 75° C at about 0.1 mm. of pressure. Fluorination of the distillates with chlorine trifluoride and bromine to remove all —CBr$_3$ end groups yields a mixture containing the new pentane. This compound can be separated by distillation through the short column in a vacuum. The plateau fraction that boils near 63° C at 0.08 mm. of Hg is guite pure.

EXAMPLE 6

Tribromofluoromethane (5,185 g.) was placed in a 5 liter flask equipped with a magnetic stirrer, a thermowell, an inlet and outlet tube and a pressure gauge. The flask was placed in a water bath in a Pyrex bell jar surrounded by 4 × 275 watt sun lamps. The temperature in the bath was maintained at 80° C.

The methane was freed of air by nitrogen and vacuum purges. Bromotrifluoroethylene (5,450 g.) was added to the closed system over a 58.5 hour period maintaining close to atmospheric pressure throughout the addition.

The pot was then stripped of low boiling components (CBr$_3$F, CF$_2$ = CFBr and others) at 60° C with a vacumn. A total of 1,761 g. was removed. After treating the residue with bromine and chlorine to remove a small amount of olefinic material the residue was stripped of an additional 1,296 g. The residue was passed through a film still at 100°–110° C at 0.2–0.4 mm. of Hg. The removal of olefinic compounds can be done equally well with chlorine alone.

All the appropriate overhead materials were combined and distilled through a 6 inch Vigreaux column at reduced pressure. The cut boiling at 63° C at 0.08 mm. of Hg is quite pure: CFBr$_2$CF$_2$CFBrCF$_2$CFBr$_2$. Analyses: Calculated for C: 10.13; for F: 22.44; for Br: 67.42; found for C: 10.32; for F: 22.55; for Br: 67.50.

As will be appreciated, the polymers are prepared by a radical polymerization of the monomers in the presence of a chain transfer agent. Ultraviolet light was used in the examples to form the radical initiators, but other sources of radicals, e.g. gamma radiation, peroxides, etc. can be used.

I claim:
1. A polymer having the formula
CFBr$_2$(CF$_2$CFBr)$_n$CF$_2$CFBr$_2$
where $n$ is 0 to 10.
2. A compound having the formula
CFBr$_2$CF$_2$CFBr$_2$.
3. A compound having the formula
CFBr$_2$CF$_2$CFBrCF$_2$CFBr$_2$
4. A polymer having the formula
CFBr$_2$(CF$_2$CFBr)$_n$CF$_2$CFBr$_2$
where $n$ is 3 to 10.
5. A polymer having the formula
CFBr$_2$(CF$_2$CFBr)$_n$CF$_2$CFBr$_2$
where $n$ is 1 to 10.

* * * * *